3,174,291
TEMPERATURE REGULATING APPARATUS
William R. Crawford and Warren R. Danielson, Benton Harbor, Mich., assignors to Whirlpool Corporation, a corporation of Delaware
Original application May 11, 1959, Ser. No. 812,171. Divided and this application Apr. 7, 1961, Ser. No. 101,596
9 Claims. (Cl. 62—3)

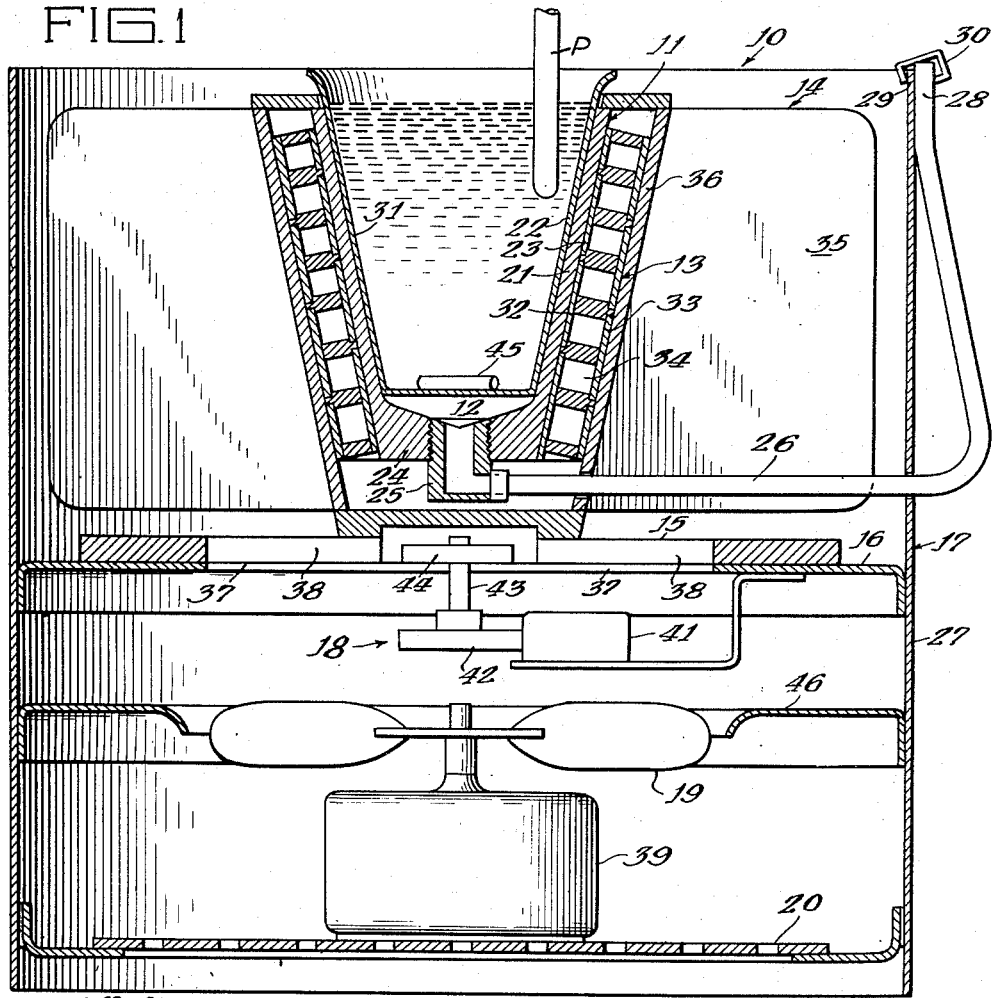
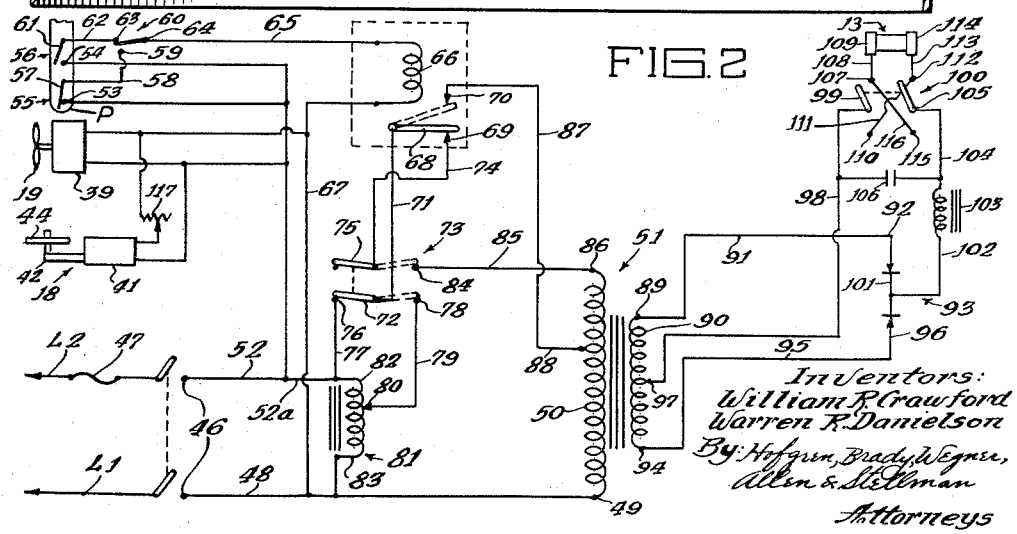

This invention relates to a temperature regulating apparatus and in particular to an apparatus arranged to heat or cool liquid to a predetermined temperature and maintain the liquid substantially at that temperature.

This application comprises a division of our copending application Serial No. 812,171, filed May 11, 1959.

The apparatus of the instant invention is related to the temperature regulating apparatus of Danielson and Lopp Patent 2,922,284, issued January 26, 1960, and assigned to the assignee of this application. The temperature regulating apparatus in that patent includes a number of the structural features provided in the instant apparatus and reference may be had to that patent for a detailed description thereof.

The principal feature of this invention is the provision of a new and improved control means in a temperature regulating apparatus providing improved efficiency and accuracy.

Still another feature of the invention is the provision of such an apparatus utilizing thermoelectric means for heating and cooling the liquid, and new and improved means for controlling the energization of the thermoelectric means.

Still another feature of the invention is the provision of such an apparatus wherein the control means includes manually adjustable means for adjusting the rate of energization of the thermoelectric means to provide "coarse" and "fine" control thereof.

Yet another feature is the provision of such an apparatus wherein the control means further includes means for variably controlling the means for adjusting the rate of energization of the thermoelectric means in at least one of the "coarse" and "fine" conditions.

Other features and advantages of the invention will be apparent from the following description, taken in connection with the accompanying drawings wherein:

FIGURE 1 is a vertical section of a temperature regulating apparatus embodying the invention.

FIGURE 2 is a schematic diagram of the electrical circuit thereof.

In the exemplary embodiment of the invention, as disclosed in the drawings, a temperature regulating apparatus generally designated 10 comprises a cup-shaped body 11 having a recess 12 for removably receiving a body of liquid to be brought to a predetermined temperature and accurately maintained at that temperature by apparatus 10. Thermoelectric means 13 are juxtaposed to body 11 to effect selectively heat transfer to and from liquid within recess 12. Extending outwardly from the thermoelectric means 13 is a heat transferring means 14 for accelerating heat transfer between the thermoelectric means 13 and the ambient atmosphere. The assembly of body 11, thermoelectric means 13 and heat transfer means 14 is carried on a support 15 which is, in turn, retained on an inwardly extending shelf 16 of an outer housing 17. Subjacent support 15 and coaxially of recess 12 is a magnetic agitator mechanism 18, and adjacently below mechanism 18, also coaxially aligned with recess 12, is a fan 19 for drawing air downwardly through heat transferring means 14 and out through perforate bottom 20 of housing 17.

More specifically, body 11 comprises a cup-shaped member formed of copper for improved heat transfer. The body includes a thin, upstanding wall 21 having parallel frusto-conical inner and outer wall surfaces 22 and 23, respectively. Extending through a transverse bottom 24 of the body 11 is an outlet fitting 25 for delivering liquid from recess 12 to an elongated flexible tube 26. Tube 26 extends outwardly through vertical side wall 27 of housing 17 and the outer end 28 thereof is removably retained against the upper end 29 of side wall 27 by a clamp 30, thereby disposing tube outer end 28 above the maximum level of liquid within recess 12. To discharge the liquid from recess 12, tube end 28 is merely released from clamp 30 and lowered to below the bottom of recess 12 whereupon the liquid may be discharged through tube 26 as desired. There may also be a valve (not shown) within fitting 25 to retain all the liquid within recess 12 during analysis.

In certain instances, it is desirable to retain the liquid to be maintained at the desired temperature in a cup 31 removably installed in recess 12 rather than directly in the recess itself. Cup 31 is preferably frusto-conical complementary to inner wall surface 22 to have good heat transfer engagement with wall surface 22. The cup is preferably formed of material having high heat conductivity such as aluminum or copper and, thus, heat transfer between liquid in cup 31 and thermoelectric means 13 is efficiently effected.

As in the above discussed Patent No. 2,922,284, thermoelectric means 13 comprises a plurality of dissimilar couples utilizing the Peltier effect to effect a heating or cooling in accordance with the polarity of a direct current flowing therethrough. Herein, thermoelectric means 13 includes inner junction plates 32, outer junction plates 33 and thermoelectric elements 34 extending between corresponding inner and outer junction plates so that the elements 34 are arranged in series electrical relationship with each other.

Heat transferring means 14 is provided to improve the efficiency of apparatus 10 permitting minimizing effectively the size thereof and increasing the energy capacity of thermoelectric means 13 by effecting improved heat transfer between the ambient atmosphere and thermoelectric means 13. Heat transferring means 14 is generally similar to the fin means of the above discussed patent. Briefly, however, the heat transferring means 14 comprises a plurality of heat transfer fins 35 each extending in a vertical plane and secured to a heat transfer plate 36 in heat transfer engagement with outer junction plates 33 of the thermoelectric means. Fins 35 are arranged in spaced relationship to each other permitting air to pass downwardly therebetween. Fan 19 accelerates this air flow by drawing ambient air downwardly between fins 35 and through openings 38 and 37 in support 15 and shelf 16, respectively, and then directing it out through bottom wall 20 of the housing 17. Upper end 29 of housing 17 is open so that the air may flow readily therethrough. As best seen in FIGURE 1, fan 19 is driven by a suitable electric motor 39 mounted on the bottom 20 of the housing 17 and a shroud 40 is carried by housing wall 27 circumjacent fan 19 to improve the efficiency of the fan.

As discussed briefly above, to improve the efficiency of heat transfer between the liquid and thermoelectric means 13, an agitator mechanism 18 is provided. This mechanism includes a motor 41 operating a drive 42 and including a shaft 43 on the upper end of which is secured a rod magnet 44. When motor 41 is operated, rod magnet 44 rotates in a horizontal plane closely adjacent bottom 24 of body 11. A coacting rod magnet 45 is disposed in cup 31 (or in the bottom of recess 12 when the cup is not being used) and the magnetic lines of force between magnets 44 and 45 causes magnet 45 to rotate in correspondence with the rotation of magnet 44. This movement of magnet 45 effects a substantial agitation of the liquid, thereby increasing the transfer of heat energy between all portions of the liquid and thermoelectric means 13.

The operation of apparatus 10 is best seen by reference to FIGURE 2. Electrical power is provided to apparatus 10 from power supply leads L1 and L2 through a manually operable disconnect switch 46. A fuse 47 may be provided in lead L2 for short-circuit protection of the apparatus 10. Power is delivered from switch 46 through a first lead 48 to one end 49 of the primary 50 of a transformer 51. A second lead 52 is connected from switch 46 to fixed contacts 53 and 54 of a pair of thermostat switches 55 and 56 within a conventional temperature sensing probe P, respectively, which sets the temperature of the liquid within recess 12 or cup 31. Thermostat switch 55 includes a normally closed moving contact 57 which is connected by a lead 58 to a first fixed contact 59 of a selector switch 60. The normally open moving contact 61 of thermostat switch 56 is connected through a lead 62 to a second fixed contact 63 of switch 60. The moving contact 64 of switch 60 is connected through a lead 65 to one side of a relay coil 66, the other side of which is connected through a lead 67 to supply lead 48. Relay coil 66 electromagnetically operates a moving contact 68 to close alternatively with fixed contacts 69 and 70. Moving contact 68 is connected by a lead 71 to a first moving contact 72 of a "Coarse-Fine" selector switch 73. Fixed contact 69 is connected by a lead 74 to a second movable contact 75 of selector switch 73. Movable contact 72 is arranged to close alternatively with a first fixed contact 76 which is connected through leads 77 and 52a to lead 52, and a second fixed contact 78 which is connected through a lead 79 to a manually adjustable tap 80 of an auto transformer 81 having one end 82 connected to lead 52a and the opposite end 83 connected to lead 48. Movable contact 75 of switch 73 is arranged to close, when movable contact 72 thereof closes with fixed contact 78, with a fixed contact 84 of switch 73 which is connected through a lead 85 to an end 86 of primary winding 50 of transformer 51, opposite end 49 thereof. Fixed contact 70 is connected through a lead 87 to an intermediate tap 88 on primary winding 50.

One end 89 of a secondary winding 90 of transformer 51 is connected through a lead 91 to one side 92 of the input to a full wave rectifier 93. The other end 94 of transformer secondary winding 90 is connected through a lead 95 to the other side 96 of the input of rectifier 93. A center tap 97 of secondary winding 90 is connected through a lead 98 to a first moving contact 99 of a double pole, double throw selector switch 100. The other side 101 of the output of rectifier 93 is connected through a lead 102 to a choke coil 103, the other side of which is connected through a lead 104 to a second movable contact 105 of selector switch 100. A capacitor 106 is connected between leads 104 and 98 to cooperate with choke coil 103 to filter the output of rectifier 93.

Movable contact 99 of selector switch 100 alternatively closes with a fixed contact 107 connected through a lead 108 to one end 109 of thermoelectric means 13, and a second fixed contact 110 connected through a strap 111 to a third fixed contact 112 connected through a lead 113 to the opposite end 114 of thermoelectric means 13. Movable contact 105 of switch 100 is alternatively closable with fixed contact 112 and a fixed contact 115 connected through a strap 116 to a fixed contact 107.

Fan motor 39 is connected directly across leads 52 and 67. Motor 41 of agitator mechanism 18 is connected in series with an adjustable rheostat 117 across leads 67 and 52. Thus, both fan 19 and agitator mechanism 18 are energized at all times when disconnect switch 46 is closed.

To operate apparatus 10, the liquid is disposed in recess 12 (or in cup 31 which is disposed in recess 12). Depending on whether the liquid is to be cooled or heated to the predetermined temperature, selector switch 100 is manually set selectively to the cooling position wherein movable contacts 99 and 105 close with fixed contacts 107 and 112, or the heating position wherein the movable contacts close with contacts 110 and 115, respectively. Selector switch 73 is set to the coarse position wherein movable contact 72 thereof closes with fixed contact 76. Assuming that the temperature of the liquid is greater than the predetermined temperature, and thus it is necessary to cool the liquid, switch 60 is set so that movable contact 64 thereof closes with fixed contact 63. As thermostat switch 61 remains closed until the temperature of the liquid drops below the predetermined temperature, when switch 46 is closed a completed circuit is effected from lead 52 through thermostat switch 56, through selector switch 60, and through relay coil 66 to lead 48. Energization of coil 66 causes movable contact 68 to close with fixed contact 70.

Thus, a circuit is completed from lead 52 through movable contact 72 of selector switch 73, through movable contact 68, through center tap 88 of the primary winding 50 of transformer 51, and through the portion of the primary winding between intermediate tap 88 and end 49 thereof to lead 48. The resulting relatively high voltage produced in secondary winding 90 of transformer 51 causes a relatively high direct current, such as 20 amperes, to be delivered from rectifier 93 to thermoelectric element 13 thereby providing a gross cooling effect on the liquid.

When the temperature of the liquid reaches the predetermined temperature, thermostat switch 56 opens thereby breaking the circuit to coil 66, whereupon movable contact 68 moves from fixed contact 70 to fixed contact 69 thereby breaking the circuit to the primary winding 50 of transformer 51. At this time, the operator may reposition selector switch 73 to the fine position shown by the dotted line position of FIGURE 2 wherein movable contacts 72 and 75 engage fixed contacts 78 and 84, respectively. This immediately effects a circuit from adjustable tap 80 of auto transformer 81 through movable contact 72 of switch 73, through movable contact 68 which is now closed with fixed contact 69 to movable contact 75 of switch 73, and from movable contact 75 to end 86 of primary winding 50 of transformer 51. Thus, a reduced voltage is produced in secondary winding 90 whereby rectifier 93 delivers a relatively small current, as 5 amperes, to thermoelectric element 13. This current is insufficient to maintain the liquid at the predetermined temperature, so that after a short period of time thermostat switch 56 closes to reenergize coil 66 and close moving contact 68 with fixed contact 70. This establishes a circuit from lead 52 through adjustable tap 80 of auto transformer 81, through moving contact 72 of switch 73, through moving contact 68 to intermediate tap 88 of transformer primary 50. The resultant increase in the secondary voltage causes rectifier 93 to deliver to thermoelectric element 13 an increased direct current, such as 10 amperes. This increased current is sufficient to effect a cooling of the liquid to restore it to the predetermined temperature.

Thus, a coarse cooling effect is provided in apparatus 10 to lower the temperature of the liquid quickly to the predetermined temperature. The coarse operation is one wherein alternatively high current and no current are delivered to the thermoelectric means. Once the liquid is brought to the predetermined temperature, the fine control thereof is effected by manipulation of switch 73, the fine operation being one in which alternatively a small current somewhat less than necessary to maintain the liquid at the predetermined temperature and a slightly greater current sufficient to lower the temperature of the liquid to the predetermined temperature are delivered to the thermoelectric means.

Should the temperature of the liquid and the ambient tempearture be such that it is necessary to heat the liquid rather than cool it to maintain it at the desired temperature, selector switch 100 and selector switch 60 are set in the opposite condition so that a reversely similar functioning of apparatus 10 is effected. More specifically, selector switch 100 is set so that movable contacts 99 and 105 close with fixed contacts 110 and 115, respectively. Selector switch 60 is set so that movable contact 64 closes with fixed contact 59. Thermostat switch 55 functions so as to remain closed until the temperature of the liquid rises to the predetermined temperature. With selector switch 73 in the coarse full line position of FIGURE 2, a substantial direct current is delivered to thermoelectric means 13 thereby effecting a high heat transfer to the liquid. When the temperature of the liquid rises to the predetermined temperature, thermostat switch 55 opens thereby discontinuing energization of the thermoelectric means. When switch 73 is thrown to the dotted, fine position of FIGURE 2, energization of the thermoelectric means is effected seriatim by a current delivered from rectifier 93 which is slightly less than that sufficient to maintain the liquid at the predetermined temperature and a current which is just sufficient to return the liquid to the predetermined temperature.

By virtue of the improved heat transfer between the liquid and the thermoelectric means effected by the agitation of the liquid and the improved body wall structure, an improved accurate temperature regulation is effected in apparatus 10. The improved efficiency in transferring heat between outer junction plates 33 and the ambient atmosphere effected by fan 19 permits a highly desirable effective minimization of the size of apparatus 10. Further, improved control regulation of the thermoelectric means effects increased accuracy and efficiency of operation thereof.

While we have shown one embodiment of our invention, it is to be understood that it is capable of many modifications. Changes, therefore, in the construction and arrangement may be made without departing from the spirit and scope of the invention as defined in the appended claims.

The embodiment of the invention in which an exclusive property or privilege is claimed is defined as follows:

1. Means for controlling the energization of a thermoelectric heating and cooling means comprising: means for providing electrical energy to the thermoelectric means; thermostatic means arranged to be responsive to a temperature produced by the thermoelectric means; and means controlling the power delivery means, said controlling means being actuated seriatim to effect seriatim different rates of electrical energy delivery to the thermoelectric means.

2. Means for controlling the energization of a thermoelectric heating and cooling means comprising: means for providing electrical energy to the thermoelectric means; and means for controlling the power delivery means to effect seriatim different rates of electrical energy delivery to the thermoelectric means, including a transformer having a winding with an intermediate tap and another connection and means for selectively using the intermediate tap and other connection to vary the power output from the transformer.

3. The means for controlling the energization of a thermoelectric heating and cooling means of claim 2 wherein said winding is the primary winding of the transformer.

4. Means for controlling the energization of a thermoelectric heating and cooling means comprising: means for providing electrical energy to the thermoelectric means; and means for controlling the power delivery means to effect seriatim different rates of electrical energy delivery to the thermoelectric means, including a manually operable control switch and circuit means arranged to cause the rate of electrical energy delivery to be seriatim zero and a first preselected rate when the switch is in one position, and to cause the rate of electrical energy delivery to be seriatim a second preselected rate and a third preselected rate when the switch is in another position.

5. The means for controlling the energization of a thermoelectric heating and cooling means of claim 4 wherein the second and third rates are substantially less than the first rate.

6. The means for controlling the energization of a thermoelectric heating and cooling means of claim 4 further including means for manually adjusting at least one of the second and third rates.

7. The means for controlling the energization of a thermoelectric heating and cooling means of claim 6 wherein the means for manually adjusting the rates comprises a variable transformer connected to said switch to provide variable input voltage to the means for providing electrical energy to the thermoelectric means.

8. In an appliance, hollow heat-insulating structure including a wall and defining a chamber, a thermoelectric pile arranged in said wall and including a plurality of thermocouples each including first-type junctions and second-type junctions, the first-type junctions of the thermocouples in said pile being arranged on the inner side of said wall and in heat-exchange relation with fluid in said chamber and the second-type junctions of the thermocouples in said pile being arranged on the outer side of said wall and in heat-exchange relation with the air outside of said chamber, apparatus selectively operative to produce a variable D.C. voltage, means connecting said apparatus to said pile so that a Peltier effect is produced thereby with the result that heat is transferred in a predetermined direction between the fluid in said chamber and the air outside of said chamber and through said wall, a temperature-sensing device responsive to the temperature of the fluid in said chamber, and means governed by said device for selectively controlling the operation of said apparatus so as selectively to establish the voltage produced thereby.

9. In an appliance, hollow heat-insulating structure including a wall and defining a chamber, a thermoelectric pile arranged in said wall and including a plurality of thermocouples each including first-type junctions and second-type junctions, the first-type junctions of the thermocouples in said pile being arranged on the inner side of said wall and in heat-exchange relation with fluid in said chamber and the second-type junctions of the thermocouples in said pile being arranged on the outer side of said wall and in heat-exchange relation with the air outside of said chamber, apparatus selectively operative to produce a variable D.C. voltage, means including a reversing switch for selectively connecting said apparatus to said pile and for selectively establishing the polarity of said connection, so that one polarity of said connection causes said pile to produce a Peltier effect with the result that heat is transferred through said wall from the fluid in said chamber into the air outside of said chamber and so that the other polarity of said connection causes said pile to produce a Peltier effect with the result that heat is transferred through said wall from the air outside of said chamber into the fluid in said chamber, a temperature-sensing device responsive to the temperature of the fluid in said chamber, and means governed by said device for selectively controlling the operation of said apparatus so as selectively to establish the voltage produced thereby.

References Cited by the Examiner

UNITED STATES PATENTS

| | | | |
|---|---|---|---|
| 1,818,437 | 9/31 | Stuart | 62—3 |
| 1,953,773 | 4/34 | Richart | 323—44 |
| 2,805,383 | 9/57 | Hurlburt | 323—44 |
| 2,986,009 | 5/61 | Gaysowski | 62—3 |

ROBERT A. O'LEARY, *Primary Examiner.*